US009524225B2

(12) United States Patent
Sivalingam et al.

(10) Patent No.: US 9,524,225 B2
(45) Date of Patent: Dec. 20, 2016

(54) DYNAMICALLY PROVIDING APPLICATION ANALYTIC INFORMATION

(75) Inventors: Lenin Ravindranath Sivalingam, Redmond, WA (US); Jitendra Padhye, Redmond, WA (US); Ian Obermiller, Renton, WA (US); Ratul Mahajan, Seattle, WA (US); Sharad Agarwal, Seattle, WA (US); Ronnie Ira Chaiken, Woodinville, WA (US); Shahin Shayandeh, Bellevue, WA (US); Christopher M. Moore, Bellevue, WA (US); Sirius Kuttiyan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 377 days.

(21) Appl. No.: 13/429,451

(22) Filed: Mar. 26, 2012

(65) Prior Publication Data

US 2013/0254749 A1 Sep. 26, 2013

(51) Int. Cl.
*G06F 9/44* (2006.01)
*G06F 11/34* (2006.01)

(52) U.S. Cl.
CPC ..... *G06F 11/3466* (2013.01); *G06F 2201/865* (2013.01)

(58) Field of Classification Search
CPC .............. G06F 11/3688; G06F 11/3664; G06F 11/3636; G06F 9/44589; G06F 2201/865; G06F 17/30893; G06F 11/3409; G06F 11/3466; G06F 11/3419; G06F 11/3438
See application file for complete search history.

(56) References Cited

U.S. PATENT DOCUMENTS

| | | | | |
|---|---|---|---|---|
| 5,960,198 | A * | 9/1999 | Roediger | G06F 11/3466 714/E11.2 |
| 7,151,438 | B1 | 12/2006 | Hall et al. | |
| 7,263,689 | B1 * | 8/2007 | Edwards | G06F 9/54 707/999.1 |
| 2003/0163608 | A1 * | 8/2003 | Tiwary et al. | 710/1 |
| 2004/0060043 | A1 * | 3/2004 | Frysinger | G06F 11/3409 717/158 |
| 2004/0088699 | A1 * | 5/2004 | Suresh | 717/174 |

(Continued)

OTHER PUBLICATIONS

Shirley A. Becker et al.; A Global Perspective on Web Site Usability; 2001 IEEE; pp. 54-61; <http://ieeexplore.ieee.org/stamp/stamp.jsp?tp=&arnumber=903167>.*

(Continued)

*Primary Examiner* — Thuy Dao
*Assistant Examiner* — Cuong V Luu
(74) *Attorney, Agent, or Firm* — Alin Corie; Sandy Swain; Micky Minhas

(57) ABSTRACT

Methods and systems for dynamically providing application analytic information are provided herein. The method includes inserting instrumentation points into an application file via an application analytic service and dynamically determining desired instrumentation points from which to collect application analytic data. The method also includes receiving, at the application analytic service, the application analytic data corresponding to the desired instrumentation points and analyzing the application analytic data to generate application analytic information. The method further includes sending the application analytic information to a client computing device.

16 Claims, 7 Drawing Sheets

300

(56) References Cited

U.S. PATENT DOCUMENTS

| | | | | |
|---|---|---|---|---|
| 2004/0158819 | A1* | 8/2004 | Cuomo | G06F 11/3624 717/128 |
| 2005/0172337 | A1* | 8/2005 | Bodorin et al. | 726/22 |
| 2007/0174490 | A1* | 7/2007 | Choi et al. | 709/246 |
| 2007/0240123 | A1* | 10/2007 | Bustelo | G06F 11/362 717/129 |
| 2008/0248788 | A1 | 10/2008 | Smith et al. | |
| 2008/0313628 | A1* | 12/2008 | Justus | G06F 9/44505 717/172 |
| 2011/0107233 | A1 | 5/2011 | Buehler et al. | |
| 2011/0238496 | A1 | 9/2011 | Gurbuxani et al. | |
| 2011/0283264 | A1* | 11/2011 | Gagliardi | G06F 11/3644 717/130 |
| 2013/0205307 | A1* | 8/2013 | Mcclain et al. | 719/320 |

OTHER PUBLICATIONS

Kazunari Sugiyama et al.; Adaptive Web Search Based on User Profile Constructed without Any Effort from Users ; 2004 ACM; pp. 675-684; <http://dl.acm.org/citation.cfm?id=988764>.*

Dave Gehrke et al.; Determinants of Successful Website Design Relative Importance and Recommendations for Effectiveness; 1999 IEEE; 8 pages; <http://ieeexplore.ieee.org/stamp/stamp.jsp?tp=&arnumber=772943>.*

Magdalini Eirinaki et al.; Web Mining for Web Personalization; 2003 ACM; 27 pages; <http://dl.acm.org/citation.cfm?id=643478>.*

Dongsong Zhang; Web Content Adaptation for Mobile Handheld Devices; 2007 ACM; pp. 75-79; <http://dl.acm.org/citation.cfm?id=1216024>.*

J. Kirakowski et al.; Human Centered Measures of Success in Web Site Design; 1998 Microsoft; 14 pages; <http://research.microsoft.com/en-us/um/people/marycz/hfweb98/kirakowski/>.*

"Mobile app analytics", Retrieved at <<http://bango.com/mobileappanalytics/>>, Retrieved Date: Dec. 22, 2011, pp. 2.

"Google Analytics", Retrieved at <<http://en.wikipedia.org/wiki/Google_Analytics>>, Retrieved Date: Dec. 22, 2011, pp. 5.

"PreEmptive Solutions Achieves Industry First with Analytics Across Mobile, Cloud, Browser and Native Applications", Retrieved at <<http://www.preemptive.com/news-events/press-releases/392>>, Sep. 13, 2011, pp. 2.

* cited by examiner

100

200

300

400

500

600

700

DYNAMICALLY PROVIDING APPLICATION ANALYTIC INFORMATION

BACKGROUND

Application developers often use application analytic services to collect tracking data about how an application, such as an application on a mobile phone, is being used. For example, application analytic services may determine the location from which an application is being used, the length of time each session of an application lasts, and the specific features of the application that are being used, among others. Developers may use this data to target their subsequent development efforts.

To install application analytic services, developers typically include code snippets in their applications. Such code snippets may upload the application tracking data to an analytic service provider. A number of vendors provide application analytic services that bundle basic application analytics, such as usage statistics and location data, with a mobile advertisement component. However, such application analytic services fail to provide performance profiling data. In addition, such application analytic services only provide for the collection of instrumentation data relating to the application in a static manner, which may not be sufficient to target the specific information that is desired by each developer.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for dynamically providing application analytic information. The method includes inserting instrumentation points into an application file via an application analytic service and dynamically determining desired instrumentation points from which to collect application analytic data. The method also includes receiving, at the application analytic service, the application analytic data corresponding to the desired instrumentation points and analyzing the application analytic data to generate application analytic information. The method further includes sending the application analytic information to a client computing device.

Another embodiment provides a system for dynamically providing application analytic information. The system includes a processor that is adapted to execute stored instructions and a system memory. The system memory includes code configured to insert instrumentation points into an application file via an application analytic service and dynamically activate or deactivate each of the instrumentation points, wherein active instrumentation points include instrumentation points for which a collection of application analytic data is desired. The system memory also includes code configured to receive the application analytic data corresponding to the active instrumentation points, analyze the application analytic data to determine application analytic information, and send the application analytic information to a client computing device.

In addition, another embodiment provides one or more computer-readable storage media for storing computer-readable instructions. The computer-readable instructions provide a dynamic application analytic system when executed by one or more processing devices. The computer-readable instructions include code configured to insert instrumentation points into an application file and dynamically assign an active status or an inactive status to each of the instrumentation points based on feedback from a client. The computer-readable instructions also include code configured to receive data corresponding to the instrumentation points with the active status, generate application analytic information from the data, and send the application analytic information to a computing device that is being used by the client.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Embodiments disclosed herein set forth a method and system for dynamically providing application analytic information to a client via an application analytic service. This may be accomplished by inserting application analytic program code into specific points within an application file that includes the application program code, and determining whether each of the points is to be activated or deactivated. In various embodiments, each point corresponds to a specific function within the application program code. Data may then be collected from the activate points, and application analytic information may be generated from the data.

Such application analytic information may include the number of devices on which the application is being run or has been installed, the number of times the application has crashed, and the manners in which users are using the application, among others.

In various embodiments, the application analytic information is provided to a client computing device that is being used by a particular client, such as, for example, the developer of the particular application. In some embodiments, developers use the application analytic information to target development efforts in order to improve the quality of the particular application. For example, the developer may add or delete features from an application, or may add additional backend servers to support a large number of users.

Figure 1:
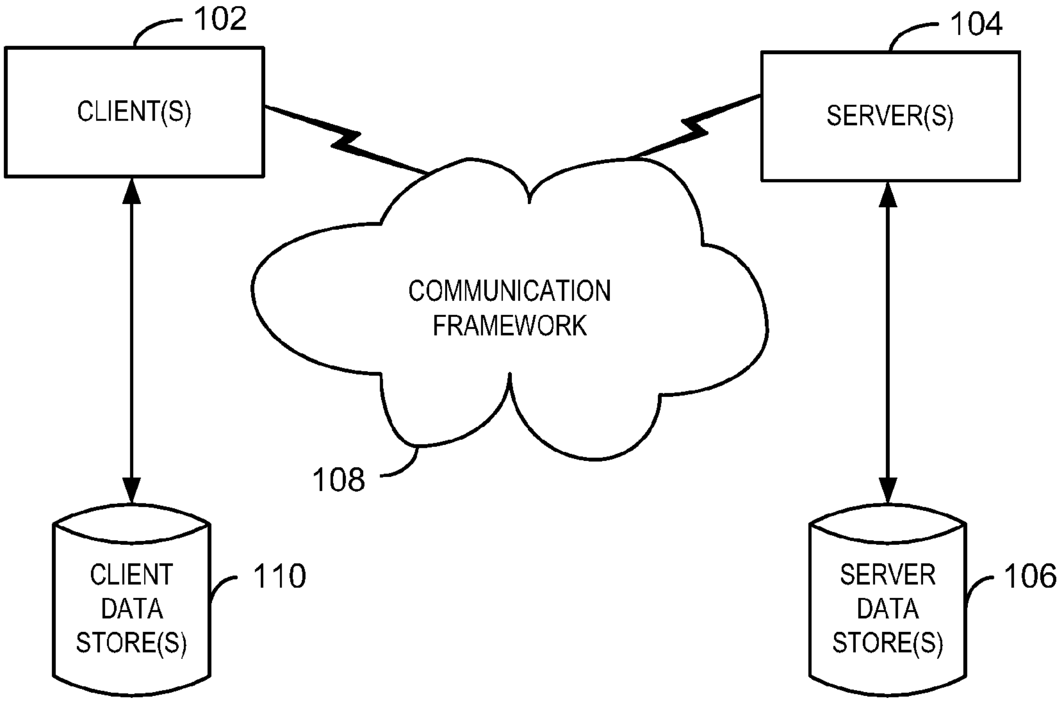
FIG. 1 is a block diagram of a networking environment in which a system and method for dynamically providing application analytic information may be implemented in accordance with embodiments.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Figure 2:
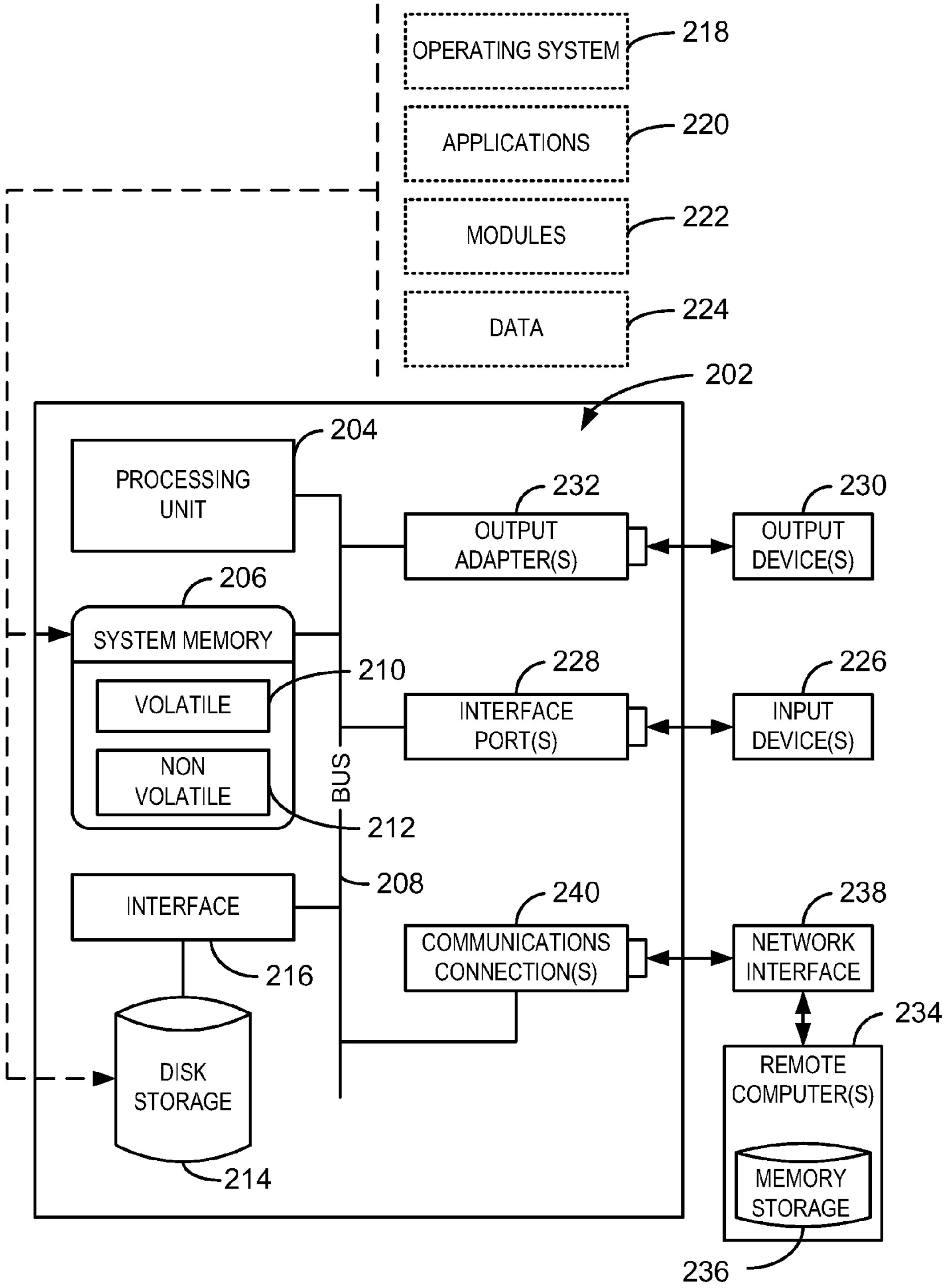
FIG. 2 is a block diagram of a computing environment that may be used to implement a system and method for dynamically providing application analytic information in accordance with embodiments.

In order to provide context for implementing various aspects of the claimed subject matter, FIGS. 1-2 and the following discussion are intended to provide a brief, general description of a computing environment in which the various aspects of the subject innovation may be implemented. For example, a method and system for providing application analytic information to developers can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a networking environment 100 in which a system and method for dynamically providing application analytic information may be implemented in accordance with embodiments. The networking environment 100 includes one or more client(s) 102. The client(s) 102 can be hardware and/or software (e.g., threads, processes, or computing devices). The networking environment 100 also includes one or more server(s) 104. The server(s) 104 can be hardware and/or software (e.g., threads, processes, or computing devices). The servers 104 can house threads to perform search operations by employing the subject innovation, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s) 104 are operably connected to one or more server data store(s) 106 that can be employed to store information local to the servers 104.

FIG. 2 is a block diagram of a computing environment 200 that may be used to implement a system and method for dynamically providing application analytic information in accordance with embodiments. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structures, including the memory bus or memory controller, a peripheral bus or external bus, or a local bus using any variety of available bus architectures known to those of ordinary skill in the art. The system memory 206 is computer-readable media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other computer-readable media, such as removable/non-removable, volatile/non-volatile computer storage media. FIG. 2 shows, for example, a disk storage 214. Disk storage 214 includes, but is not limited to, devices like a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 include, but are not limited to, a pointing device (such as a mouse, trackball, stylus, or the like), a keyboard, a microphone, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 can be a server hosting an event forecasting system in a networking environment, such as the networking environment 100, using logical connections to one or more remote computers, such as remote computer(s) 234. The remote computer(s) 234 may be client systems configured with web browsers, PC applications, mobile phone applications, and the like. The remote computer(s) 234 can be a personal computer, a server, a router, a network PC, a workstation, a microprocessor based appliance, a mobile phone, a peer device or other common network node and the like, and typically includes many or all of the elements described relative to the computer 202. For purposes of brevity, the remote computer(s) 234 is illustrated with a memory storage device 236. Remote computer(s) 234 is logically connected to the computer 202 through a network interface 238 and then physically connected via a communication connection 240.

Network interface 238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware/software employed to connect the network interface 238 to the system bus 208. While communication connection 240 is shown for illustrative clarity inside computer 202, it can also be external to the computer 202. The hardware/software for connection to the network interface 238 may include, for example, internal and external technologies such as mobile phone switches, modems including regular telephone grade modems, cable modems and DSL modems, ISDN adapters, and Ethernet cards.

Figure 3:
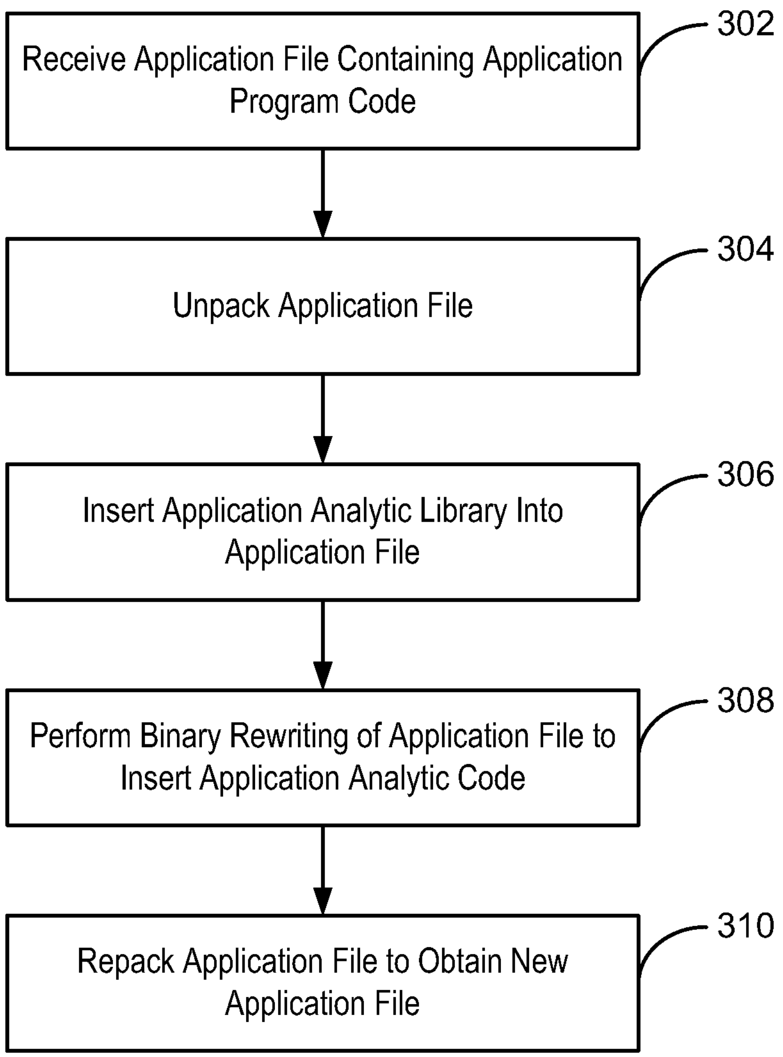
FIG. 3 is a block of a method for binary rewriting of an application file that may be used in accordance with embodiments.

FIG. 3 is a block of a method 300 for binary rewriting of an application file that may be used in accordance with embodiments. In various embodiments, the method 300 is used to insert application analytic code into the application file. The method begins at block 302, at which an application file containing the program code for a particular application is received. The application file may be in any type of file, such as, for example, a zipped file. In addition, the application file may be a binary file. The application file may be received at an application analytic service, as discussed further below with respect to FIGS. 4 and 5. In various embodiments, the application analytic service is hosted within an online marketplace.

At block 304, the application file may be unpacked. Once the application file has been unpacked, the application manifest, which may include metadata files and property files, for example, may be located within the unpacked application file.

At block 306, an application analytic library may be inserted into the application file. The application analytic library is an agent that is capable of collecting application analytic information from instrumentation points within the application file, as discussed further with respect to block 308. In various examples, the insertion of the application analytic library into the application file may be performed by a rewriter of the application analytic service.

At block 308, binary rewriting of the application file may be performed to insert the application analytic code. The insertion of the application analytic code may provide the application analytic service with the ability to collect application analytic data relating to the application. In various examples, the binary rewriting of the application file may also be performed by the rewriter of the application analytic service.

At block 310, the application file may be repacked to obtain a new application file. The new application file may include application analytic capabilities and, thus, may be used by the application analytic service to determine application analytic information. In addition, once the application file has been repacked, the application may be ready to be launched, or may be further modified by the developer prior to being launched. If the application is ready to be launched, the developer may decide to sell the application through the online marketplace.

FIG. 3 is not intended to indicate that the steps of the method 300 are to be executed in any particular order, or that all of the steps of the method 300 are to be included in every case. Further, any number of additional steps may be included within the method 300, depending on the specific application.

Figure 4:
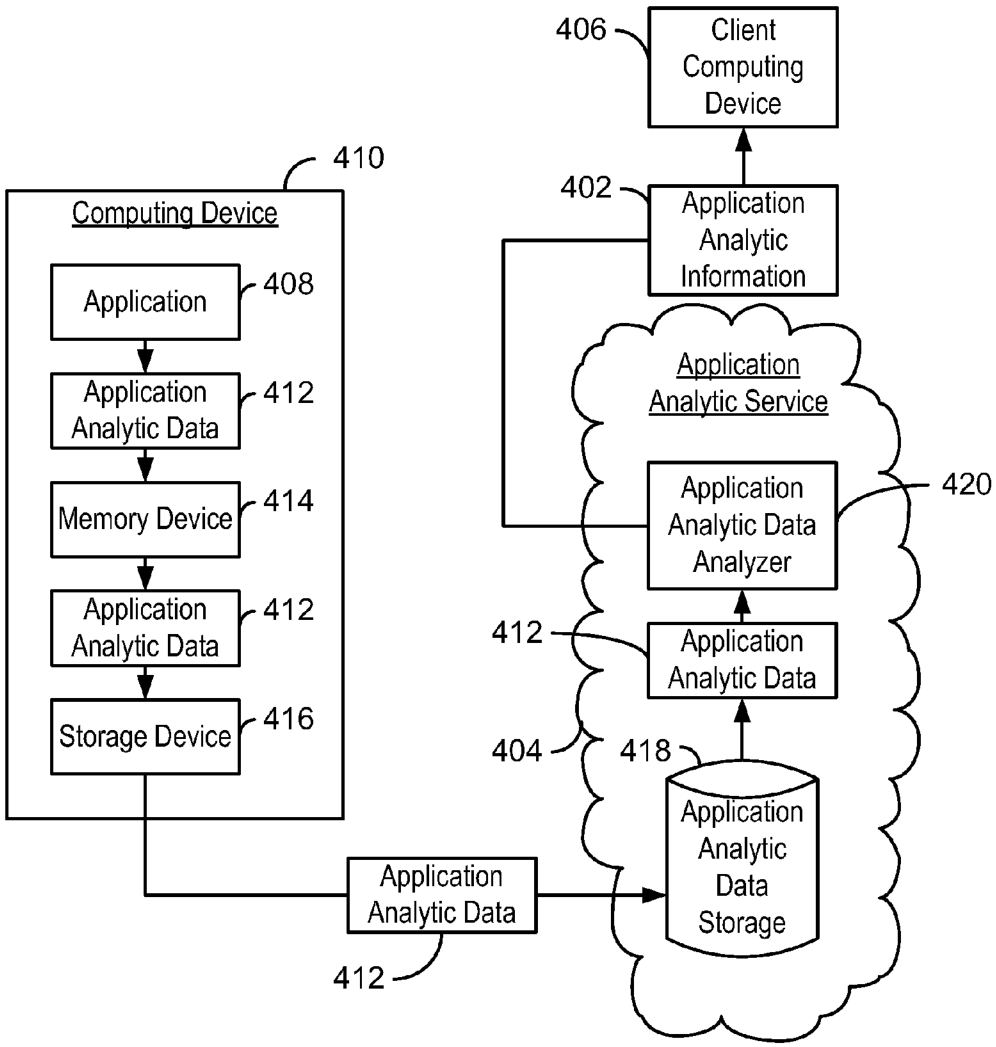
FIG. 4 is a block diagram of a basic application analytic system that may be used to dynamically provide application analytic information in accordance with embodiments.

FIG. 4 is a block diagram of a basic application analytic system 400 that may be used to dynamically provide application analytic information 402 in accordance with embodiments. The basic application analytic system 400 may be used to implement a basic mode of an application analytic service 404. In some embodiments, the application analytic service 404 is hosted within a cloud computing environment, as shown in FIG. 4, such as through an online marketplace (not shown). In other embodiments, the application analytic service 404 is hosted directly within a client computing device 406.

The client computing device 406 may be any type of computing device that is being operated by a user who has been granted access to the application analytic information 402 relating to a particular application 408. For example, the client computing device 406 may be operated by the developer of the application 408.

The application 408 may be located within a computing device 410. In addition, the application 408 may be located within any number of additional computing devices 410. In various embodiments, each user of the application 408 may run the application 408 on one or more different computing devices 410. The computing device 410 may be any type of computing device that is capable of running the application 408 such as, for example, a desktop computer, laptop computer, tablet computer, or mobile phone, among others.

In various embodiments, the application 408 is altered by the application analytic service 404 prior to the release of the application 408. For example, the application 408 may be uploaded to the application analytic service 404 via a network (not shown). The application analytic service 404 may then perform binary rewriting of the application 408 in order to include application analytic code within the application file, as discussed above with respect to the method 300 of FIG. 3. The application analytic code may include tracing calls that are included within instrumentation points throughout the program code of the application. For example, each function call may include its own instrumentation point. Once the application 408 has been modified by the application analytic service 404, the user of the computing device 410 may download the application 408 onto the computing device 410.

When the application 408 is run on the computing device 410, the application analytic code, e.g., the tracing calls, may cause the computing device 410 to extract application analytic data 412 relating to each of the instrumentation points. The application analytic data 412 may be temporarily stored in a memory device 414 on the computing device 410. The memory device 414 can include random access memory (RAM), read only memory (ROM), flash memory, or any other suitable memory systems. The memory device 414 may store the application analytic data 412 for a specific period of time, or may only store the application analytic data 412 until a session of the application 408 ends.

The application analytic data 412 may then be transferred from the memory device 414 to a storage device 416 on the computing device 410. The storage device 416 can include a hard drive, an optical drive, a thumbdrive, an array of drives, or any combinations thereof. In various embodiments, the storage device 416 stores the application analytic data 412 until the application analytic data 412 may be uploaded to application analytic data storage 418 within the application analytic service 404.

The application analytic data storage 418 may be configured to store the application analytic data 412 for an extended period of time. In addition, the application analytic data storage 418 may store application analytic data 412 relating to the application 408 that is received from a number of other computing devices 410. In some embodiments, the application analytic data storage 418 is a database, such as a cloud database.

From the application analytic data storage 418, the application analytic data 412 may be sent to an application analytic data analyzer 420. The application analytic data analyzer 420 may be configured to generate application analytic information 402 from the application analytic data 412. In various embodiments, the application analytic data 412 contains the raw data that is obtained from the application 408, while the application analytic information 402 contains detailed information relating to the performance of the application 408. For example, the application analytic information 402 may include information relating to errors that are occurring within the application 408, as well as information relating to possible causes of the errors that were identified based on the application analytic data 412.

The application analytic service 404 may provide the application analytic information 402 to the client computing device 406. The user of the client computing device 406, e.g., the developer of the application 408, may then modify the application accordingly. For example, if the number of users of the application 408 has grown significantly, the developer may decide to add additional backend servers to increase the speed of the application 408.

Figure 5:
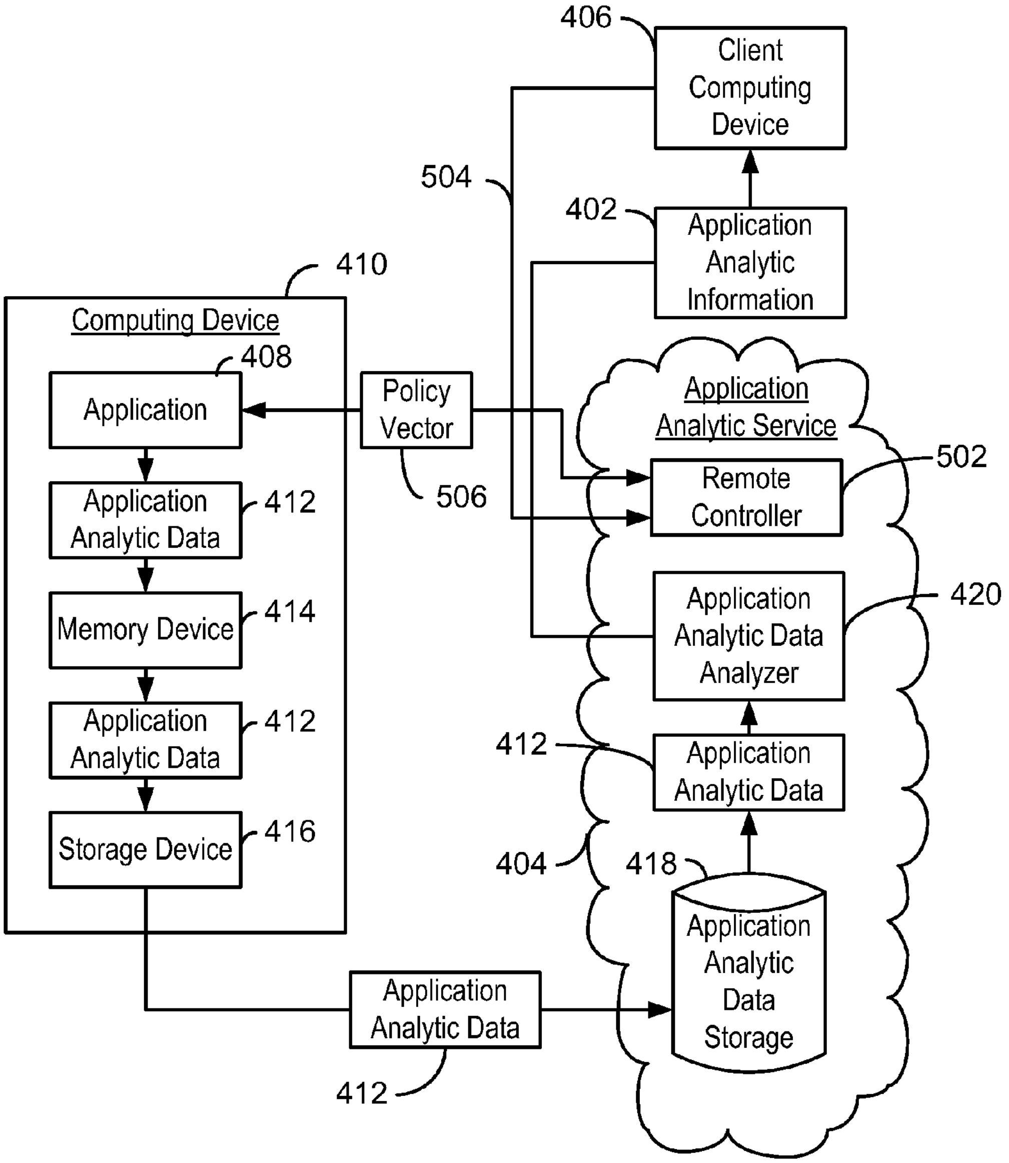
FIG. 5 is a block diagram of a custom application analytic system that may be used to dynamically provide application analytic information in accordance with embodiments.

FIG. 5 is a block diagram of a custom application analytic system 500 that may be used to dynamically provide application analytic information in accordance with embodiments. Like numbered items are as described with respect to FIG. 4. The custom application analytic system 500 may be used to implement a custom mode of the application analytic service 404. The custom mode of the application analytic service 404 may provide the user of the client computing device 406 with additional capabilities that are not provided by the basic mode of the application analytic service 404.

Within the custom application analytic system 500, the application analytic service 404 may include a remote controller 502. The remote controller 502 may be used to adjust the type of application analytic data 412 that is collected from the application 408. Such an adjustment may be performed in response to an input from the user of the client computing device 406, as indicated by arrow 504. For example, the user may determine what type of application analytic data 412 to collect, such as session info or user info, as well as the manner in which to collect the application analytic data 412, such as through the use of counters or timers, among others. Once the user of the client computing device 406 communicates such preferences to the application analytic service 404, the remote controller 502 may be used to activate or deactivate each of the instrumentation points within the application program code.

In some embodiments, the user of the client computing device 406 is a developer of the application 408. Thus, the developer of the application 408 may use the remote controller 502 to specify the type of application analytic data 412 to collect from the application 408 as it is operating on the computing device 410, as well as any number of other computing devices 410.

In various embodiments, the activation or deactivation of instrumentation points is accomplished using a policy vector 506. The policy vector 506 may be a vector that is generated by the application analytic service 404 based on the input of the user of the client computing device 406. The policy vector 506 may be used to turn instrumentation points on or off within the application program code.

Figure 6:
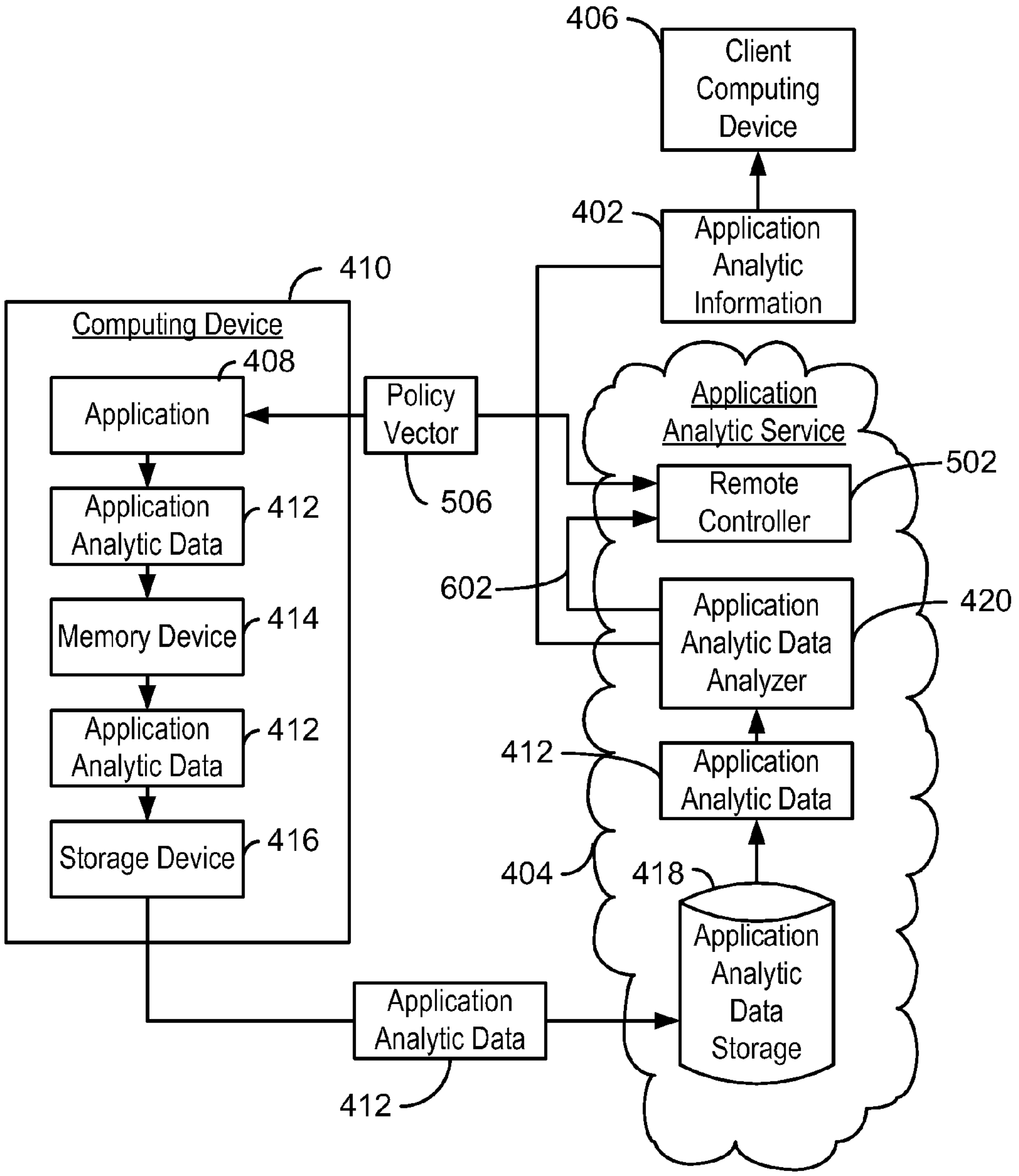
FIG. 6 is a block diagram of an automatic application analytic system that may be used to dynamically and automatically provide application analytic information in accordance with embodiments.

FIG. 6 is a block diagram of an automatic application analytic system 600 that may be used to dynamically and automatically provide application analytic information in accordance with embodiments. Like numbered items are as described with respect to FIGS. 4 and 5. The automatic application analytic system 600 may be used to implement an automatic mode of the application analytic service 404.

Similarly to the custom application analytic system 500, the automatic application analytic system 600 may include the remote controller 502. However, instead of generating the policy vector 506 based on the input of the user of the client computing device 406, as discussed with respect to the custom application analytic system 500, the policy vector 506 is generated automatically by the application analytic service 404. The application analytic service 404 may automatically determine which instrumentation points to activate or deactivate based on the application analytic information 402 that is generated from the application analytic data 412. Further, in various embodiments, the application analytic data analyzer 420 assists in the generation of the policy vector 506, as indicated by arrow 602.

As an example, within the automatic application analytic system 600, the application analytic service 404 may increase the number of instrumentation points of a certain type that are activated if it is determined that a large number of such instrumentation points are failing. As another example, the application analytic service 404 may activate a number of instrumentation points surrounding a failed instrumentation point in order to determine whether the error is resulting from a hardware malfunction or a problem within the application program code, for example.

Further, within the automatic application analytic system 600, the application analytic service 404 may include the capability to perform sampling techniques to maximize the amount of application analytic data which is collected while minimizing the overhead costs. This may be accomplished by the application analytic service 404 using any of a variety of application analytic algorithms. The application analytic algorithms may be used to determine, for example, an appropriate sampling size, an appropriate sampling interval, and an appropriate number of sampling instances for collecting the application analytic data 412 from the application 408.

Figure 7:
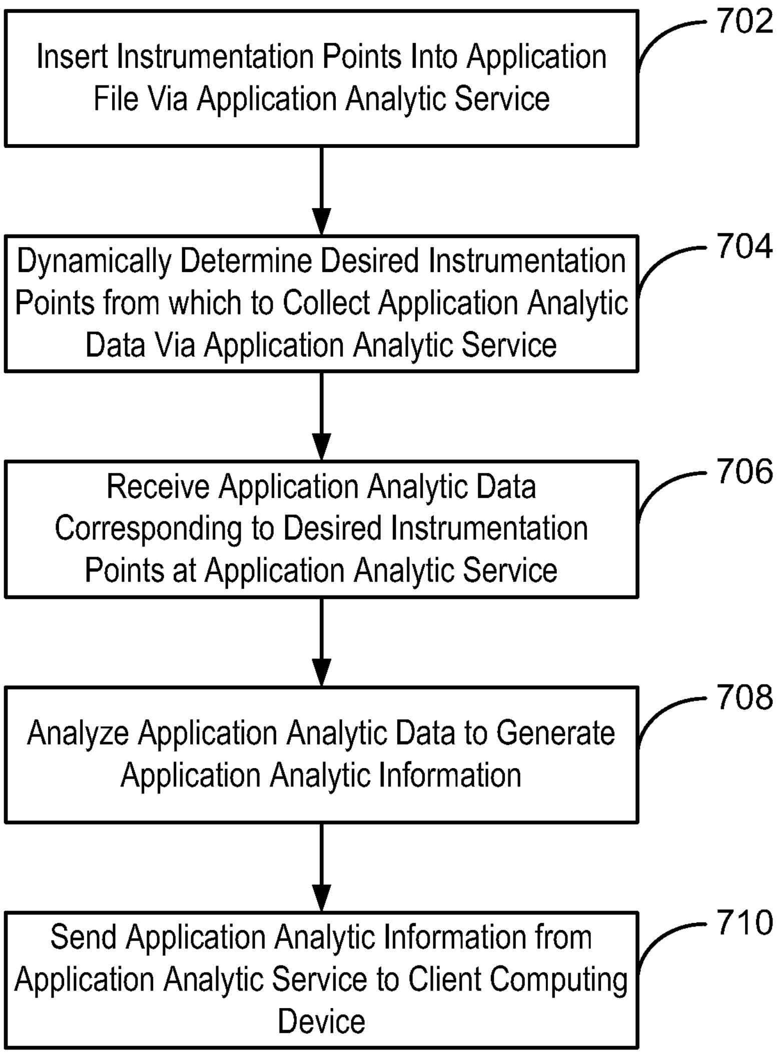
FIG. 7 is a process flow diagram showing a method for dynamically providing application analytic information in accordance with embodiments.

FIG. 7 is a process flow diagram showing a method 700 for dynamically providing application analytic information in accordance with embodiments. The method 700 may be implemented using the basic application analytic system 400, the custom application analytic system 500, or the automatic application analytic system 600, or any combinations thereof. For example, the client may select a basic application analytic mode, a custom application analytic mode, or an automatic application analytic mode via a user interface, and the functioning of the application analytic service may be adjusted based on the selection. Further, the client may change the selected application analytic mode at any point in time. Thus, the method 700 provides for the dynamic and adaptive collection of application analytic information according to the desires of the particular client.

The method 700 may often involve very little input from the client. For example, in the case of the basic mode and the automatic mode of the application analytic service, the method 700 may only involve one input, e.g., one mouse click, by the client. In addition, in the case of the custom mode of the application analytic service, the client may provide as much or as little input as desired. Thus, the application analytic service imposes a very low burden on the client.

The method begins at block 702, at which instrumentation points are inserted into an application file via an application analytic service. The instrumentation points may be implemented using tracing calls that are inserted into the application file, or application program code. The tracing calls may be inserted in to the application file in the form of application analytic code, and each of the tracing calls may relate to a specific function within the application program code. The tracing calls may be utilized to collect a variety of different types of information depending on the type of tracing call which is used. For example, a counter may be used to determine the number of times a particular function is called, while a timer may be used to determine the amount of time it takes to complete a particular function.

In various embodiments, the insertion of the instrumentation points is achieved via the method 300 discussed above with respect to FIG. 3. More specifically, the insertion of the instrumentation points into the application file may include performing binary rewriting of the application file. Further, once the instrumentation points have been inserted into the application file, the application may be launched within any number of user computing devices.

At block 704, desired instrumentation points from which to collect application analytic data may be dynamically determined via the application analytic service. The desired instrumentation points may be activated, while the undesired instrumentation points may be deactivated. The manner in which the desired instrumentation points are determined depends on whether the application analytic service is in the basic mode, custom mode, or automatic mode.

In various embodiments, the mode of the application is chosen by the client, e.g., the application developer or an administrator of the marketplace service in which the application is hosted. If the application analytic service is in the basic mode, the application analytic service may simply activate any number of basic instrumentation points, which will result in the collection of basic application analytic data. If the application analytic service is in the custom mode, the desired instrumentation points may be determined in response to an input from a client via the client computing device. If the application analytic service is in the automatic mode, the application analytic service may automatically determine the desired instrumentation points based on an analysis of information about the application, as well as an analysis of any prior application analytic data that was collected from the application.

In various embodiments, the activation or deactivation of instrumentation points is accomplished using a remote controller that is configured to dynamically turn instrumentation points on or off. The remote controller may activate or deactivate the instrumentation points by applying a policy vector to the instrumentation points.

At block 706, application analytic data corresponding to the desired instrumentation points may be received at the application analytic service. In various embodiments, such application analytic data is received from a number of computing devices on which the particular application is located.

At block 708, the application analytic data may be analyzed to generate application analytic information. The generation of the application analytic information may be performed by the application analytic service using, for example, an application analytic data analyzer.

The application analytic information may include performance profiling information that may be used by a client, such as the developer of the application, to modify and improve the application. For example, the application analytic information may include information about the locations, dates, and times during which the application has been used, as well as information about the users of the application. The application analytic information may also include information about the application sessions, the computing devices on which the application is being run, and the application errors that have occurred. Further, application analytic information may include average statistics across multiple sessions of the application.

At block 710, the application analytic information may be sent from the application analytic service to the client computing device. The client may then use the application analytic information to improve the quality of the application. For example, the client may be able to target specific aspects of the application to change or update based on the application analytic information.

In some embodiments, the application analytic information is presented to the client in terms of time, energy, e.g., batter power, memory, and network. These four conditions may be used by the client to determine the overall performance of the application based on several considerations, such as the speed of the application and the cost of running the application, among others.

Further, in some embodiments, the application analytic information is also sent to the online marketplace in which the application is hosted. The online marketplace may use the application analytic information for a variety of purposes, such as, for example, to improve application recommendation procedures.

FIG. 7 is not intended to indicate that the steps of the method 700 are to be executed in any particular order, or that all of the steps of the method 700 are to be included in every case. Further, any number of additional steps may be included within the method 700, depending on the specific application. For example, the application analytic data may be used to determine a user-perceived transaction delay from the desired instrumentation points. For example, the user-perceived transaction delay may be determined by combining application analytic data obtained from several instrumentation points. The user-perceived transaction delay may then be sent to the client computing device as a portion of the application analytic information.

In some embodiments, the application analytic information that is generated according to the method 700 also includes page navigation information. Such page navigation information may include, for example, information about the average length of time that users are spending on each page within the application, as well information about which pages are being used when users exit the application and which pages are being switched to from other pages. The developer may use the page navigation information to analyze the manner in which users are navigating through the application, and may modify the application accordingly.

Further, in some embodiments, the application analytic information includes per function information, e.g., information relating to each function. The per function information may include, for example, the number of times each function is being called and the amount of time it takes to complete each function. The developer may use the per function information to improve the application by targeting specific functions to modify. For example, if a function execution takes a long time, the developer may make changes to the application to decrease the execution time of the function.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method executable by a processor for dynamically providing application analytic information, comprising:

inserting instrumentation points into an application file via an application analytic service;

packing the application file, including the instrumentation points, to obtain a new application file to include analytic capabilities for use by the analytic service;

determining desired instrumentation points from which to collect application analytic data via the application analytic service after inserting the instrumentation points into the application file;

receiving, at the application analytic service, the application analytic data;

analyzing the application analytic data to generate application analytic information;

the application analytic information comprising page navigation information;

adjusting an active status or an inactive status of each of the desired instrumentation points based on the application analytic information; and sending the application analytic information from the application analytic service to a client computing device.

2. The method of claim 1, wherein inserting the instrumentation points into the application file comprises performing binary rewriting of the application file.

3. The method of claim 1, wherein each of the instrumentation points relates to a function within the application file.

4. The method of claim 1, wherein receiving the application analytic data comprises receiving application analytic data from a plurality of computing devices on which an application that corresponds to the new application file is located.

5. The method of claim 1, comprising:

using the application analytic data to determine a user-perceived transaction delay from the desired instrumentation points; and sending the user-perceived transaction delay to the client computing device as a portion of the application analytic information.

6. The method claim 1, comprising:

allowing a client to select a basic application analytic mode, a custom application analytic mode, or an automatic application analytic mode via a user interface hosted within the client computing device; and adjusting a functioning of the application analytic service based on the selection.

7. The method of claim 1, wherein the application analytic service is to increase a number of instrumentation points of a type that are activated in response to determining from the application analytic information that instrumentation points of the type are failing.

8. The method of claim 1, wherein the application file is unpacked prior to the inserting of instrumentation points into the application file.

9. A system for dynamically providing application analytic information, comprising:

a processor that is adapted to execute stored instructions; and a system memory, wherein the system memory comprises code configured to:

insert instrumentation points into an application file via an application analytic service;

pack the application file, including the instrumentation points, to obtain a new application file to include analytic capabilities for use by the application analytic service;

activate or deactivate each of the instrumentation points based on a detected automatic application analytic mode, wherein active instrumentation points comprise instrumentation points for which a collection of application analytic data is desired;

receive the application analytic data;

analyze the application analytic data to determine application analytic information, the application analytic information comprising page navigation information;

activate or deactivate each of the instrumentation points based on the application analytic information; and send the application analytic information to a client computing device.

10. The system of claim 9, wherein the application file comprises a manifest relating to a specific application.

11. The system of claim 9, wherein each of the instrumentation points comprises a tracing call that corresponds to a specific function within the application file.

12. The system of claim 11, wherein the application analytic information comprises per function information, and wherein the per function information comprises information relating to each function.

13. The system of claim 9, comprising a remote controller that is configured to activate or deactivate the instrumentation points.

14. The system of claim 13, wherein the remote controller activates or deactivates the instrumentation points based on feedback from the client computing device.

15. One or more computer-readable storage media for storing computer-readable instructions, the computer-readable instructions providing a dynamic application analytic system when executed by one or more processing devices, the computer-readable instructions comprising code configured to:

insert instrumentation points into an application file;

pack the application file, including the instrumentation points, to obtain a new application file to include analytic capabilities for use by the dynamic application analytic system;

detect a selection of an automatic mode for the dynamic application analytic system;

assign an active status or an inactive status to each of the instrumentation points based on the detected automatic mode;

receive data;

generate application analytic information from the data, the application analytic information comprising page navigation information;

adjust an active status or the inactive status of each of the instrumentation points based on the application analytic information; and send the application analytic information to a computing device.

16. The one or more computer-readable storage media of claim 15, wherein the computer-readable instructions comprise code configured to adjust the active status or the inactive status of each of the instrumentation points in response to detecting a custom application analytic mode, and wherein adjusting the active status or the inactive status comprises adjusting the active status or the inactive status based on detected dynamic input.

* * * * *